United States Patent
Urech et al.

(10) Patent No.: US 7,596,848 B2
(45) Date of Patent: Oct. 6, 2009

(54) METHOD FOR PRODUCING BIMETALLIC LINE PIPE

(75) Inventors: Bowman A. Urech, Plano, TX (US); Tommy Stewart, Daingerfield, TX (US); Paul Fullerton, Plano, TX (US)

(73) Assignee: United States Steel Corporation, Pittsburgh, PA (US)

( * ) Notice: Subject to any disclaimer, the term of this patent is extended or adjusted under 35 U.S.C. 154(b) by 535 days.

(21) Appl. No.: 11/072,352

(22) Filed: Mar. 4, 2005

(65) Prior Publication Data

US 2005/0251987 A1    Nov. 17, 2005

Related U.S. Application Data

(60) Provisional application No. 60/645,250, filed on Jan. 19, 2005, provisional application No. 60/610,322, filed on Sep. 16, 2004, provisional application No. 60/561,419, filed on Apr. 12, 2004.

(51) Int. Cl.
*B23P 11/00* (2006.01)
*B23P 11/02* (2006.01)

(52) U.S. Cl. .......................................... 29/516; 29/508

(58) Field of Classification Search ................. 29/516, 29/33 D, 505, 445, 455.1, 520, 508; 138/41, 138/43, 45, 142, 143; 285/370; 228/131, 228/132, 126

See application file for complete search history.

(56) References Cited

U.S. PATENT DOCUMENTS

| | | | |
|---|---|---|---|
| 831,887 A | 9/1906 | Nicholson | |
| 2,371,348 A | 3/1945 | Murray | |
| 3,397,445 A | 8/1968 | Ulmer et al. | |
| 3,481,024 A | 12/1969 | Bunn | |
| 3,604,102 A | 9/1971 | Boccalari et al. | 29/474.3 |
| 3,735,478 A | 5/1973 | Porter et al. | 29/477.3 |
| 3,859,058 A | 1/1975 | Anthony et al. | 29/191 |
| 4,031,921 A | 6/1977 | Maroni et al. | 138/140 |
| 4,049,184 A | 9/1977 | Rozengart et al. | 228/131 |
| 4,125,924 A | 11/1978 | Goetze et al. | 29/148.4 |
| 4,162,758 A | 7/1979 | Mikarai | 228/131 |
| 4,319,121 A | 3/1982 | Yoshida | 219/121 |
| 4,367,838 A | 1/1983 | Yoshida | 228/112 |

(Continued)

FOREIGN PATENT DOCUMENTS

CN    13204932 A    5/2001

(Continued)

OTHER PUBLICATIONS

Chinese Office Action Application No. 200510106723.0, 5 pages, Jan. 4, 2008.

*Primary Examiner*—John C Hong
(74) *Attorney, Agent, or Firm*—Baker Botts L.L.P.

(57) ABSTRACT

The present invention involves a system and method for producing bimetallic pipe. In one embodiment of the present invention, the method includes inserting an inner shell into an outer shell and reducing the outer shell to securely engage the inner shell by drawing the outer shell and inner shell through a die without the use of a mandrel placed in the inner shell. In another embodiment of the present invention, the method includes inserting an inner shell into an outer shell and reducing the outer shell to securely engage the inner shell by sizing the outer shell using at least one roller stand.

27 Claims, 4 Drawing Sheets

U.S. PATENT DOCUMENTS

| | | | |
|---|---|---|---|
| 4,470,188 A * | 9/1984 | Holbrook et al. | 29/445 |
| 4,533,806 A | 8/1985 | Kawasaki et al. | 219/8.5 |
| 4,566,240 A | 1/1986 | Schilger | 52/414 |
| 4,765,529 A | 8/1988 | Turner | 228/132 |
| 4,784,311 A | 11/1988 | Sugao | 228/131 |
| 4,795,078 A | 1/1989 | Kuroki et al. | 228/131 |
| 4,885,215 A | 12/1989 | Yoshioka et al. | 428/632 |
| 4,886,203 A | 12/1989 | Puzrin et al. | 228/126 |
| 4,943,489 A | 7/1990 | Kuhara et al. | 428/586 |
| 5,005,756 A | 4/1991 | Muggeo et al. | 228/127 |
| 5,131,583 A | 7/1992 | Matsumoto | 228/132 |
| 5,265,790 A | 11/1993 | Mumford, III et al. | 228/189 |
| 5,275,893 A | 1/1994 | Miyasaka et al. | 428/683 |
| 5,988,484 A | 11/1999 | Osborn et al. | 228/126 |
| 6,250,125 B1 | 6/2001 | Ukai et al. | 72/214 |
| 2003/0094209 A1 | 5/2003 | Imasaki et al. | 138/142 |
| 2005/0005983 A1 | 1/2005 | Lewis | 138/41 |
| 2005/0006899 A1 | 1/2005 | Lewis | 285/370 |

FOREIGN PATENT DOCUMENTS

| | | |
|---|---|---|
| JP | 61-27118 | 2/1986 |

* cited by examiner

METHOD FOR PRODUCING BIMETALLIC LINE PIPE

RELATED APPLICATIONS

This application claims the benefit of provisional patent application entitled "System and Method for Producing Bimetallic Line Pipe," Application Ser. No. 60/561,419 filed Apr. 12, 2004.

This application claims the benefit of provisional patent application entitled "System and Method for Producing Bimetallic Line Pipe," Application Ser. No. 60/610,322 filed Sep. 16, 2004.

This application claims the benefit of provisional patent application entitled "System and Method for Producing Bimetallic Line Pipe," Application Ser. No. 60/645,250 filed Jan. 19, 2005.

TECHNICAL FIELD

The present invention is related in general to corrosion resistant bimetallic pipe used in line pipe, casing and tubing applications and in particular to a cost-effective, efficient system and method for producing bimetallic pipe to meet changing industry requirements.

BACKGROUND OF THE INVENTION

In many industries, pipes carry corrosive substances under high pressures. The need for durable pipe having corrosion resistant characteristics has long been recognized. Previous methods of producing corrosion resistant pipe include such methods as electro-deposition, flame spraying and other coating techniques to cover the interior of the pipe. Other examples of pipe produced to accomplish these goals include composite and bimetallic pipe with a corrosion resistant inner shell alloy surrounded by a durable outer shell that is able to withstand internal pressures and external forces.

There are many known methods to produce both composite pipe and bimetallic pipe. In one method, an inner pipe may be inserted into an outer pipe and the inner pipe then expanded to contact an inner surface of the outer pipe. In one process, the inner pipe may be expanded using high water pressure. In another process an outer pipe may be heated to allow insertion of an inner pipe. The outer pipe may then be cooled and shrunk to obtain a tight fit between the two pipes. These methods typically include relatively large scale devices and equipment which are often disadvantageously expensive. Another difficulty arises with manufacturing tubes or pipes of long length since the weight and size of associated devices and equipment often becomes relatively large and expensive.

Other methods to form bimetallic pipes include weld-deposit overlaying and drawing pipes through a die over a mandrel. Weld-deposit overlays are often time consuming and require additional machining. A typical drawing process includes forcing a pair of telescoped pipes through a die and over a mandrel disposed within the inside diameter of the inner pipe. The use of a mandrel with this technique may limit the length of bimetallic pipe that can be produced, limit the wall thickness of the pipes that can be drawn and/or increase costs.

SUMMARY OF THE INVENTION

In accordance with teachings of the present invention, a system and method are described for producing bimetallic pipe that substantially reduce disadvantages and problems associated with previous systems and methods of producing corrosion resistant pipe. In one embodiment, a method for producing bimetallic pipe includes providing an outer shell and an inner shell. The outer shell has an inner diameter larger than an outer diameter of the inner shell. The inner shell may be inserted into the outer shell. The outer shell may be reduced to securely engage the inner shell by drawing the outer shell with the inner shell disposed therein through a die without placing a mandrel within the inner shell. Some applications may include annealing the outer and inner shells after reducing the outer shell.

In another aspect of the invention, a method for producing bimetallic pipe includes providing an outer shell and an inner shell. The outer shell has an inner diameter larger than an outer diameter of the inner shell. The inner shell may be inserted into the outer shell. The method may then reduce the outer shell by sizing the outer shell with the inner shell disposed therein through at least one roller stand.

In one embodiment of the present invention, a system for producing bimetallic pipe includes a size reducing line for sizing pipe with an outer shell and an inner shell. The system may also include at least four roller stands for reducing the diameter of the outer shell to securely engage an inner shell without substantially reducing the outer diameter of the inner shell. For some applications, the system may include at least four roller stands operable to reduce the diameter of the outer shelf to securely engage an inner shell by reducing the outer diameter of the inner shell. Each roller stand may include at least two rollers.

Teachings of the present invention may also be used to produce bimetallic oil country tubular goods (OCTG) such as tubing, casing, pup joints and risers.

BRIEF DESCRIPTION OF THE DRAWINGS

A more complete and thorough understanding of the present invention and advantages thereof may be acquired by referring to the following description taken in conjunction with the accompanying drawings, in which like reference numbers indicate like features, and wherein.

DETAILED DESCRIPTION OF THE INVENTION

Preferred embodiments of the invention and its advantages are best understood by reference to FIGS. 1A-6 wherein like numbers refer to same and like parts.

The present invention relates to a system and a method for efficient production of bimetallic pipe to meet a wide range of industry requirements. Depending on planned use, bimetallic pipe may be produced to meet multiple industry requirements. For example, line pipe that will transport substances under high pressure may need to meet certain American Petroleum Institute (API) requirements and performance ratings. It may also be desirable that the line pipe will not be corroded by substances it is transporting. Depending on each substance, for example, well fluid or hydrocarbon mixtures, there are various corrosion resistant alloys (CRA) satisfactory for use with respective well fluids and hydrocarbon mixtures. The present invention allows use of any CRA pipe or tube as lining for bimetallic line pipe and bimetallic oil country tubular goods.

For some applications an outer shell formed from hard materials such as steel alloys may be used to protect an inner shell formed from softer materials such as aluminum alloys. This combination may also be referred to as CRA pipe or tubing depending upon the specific application. The present invention allows quick and efficient production of line pipe, casing or tubing lined with appropriate CRA pipe.

Figure 1A:
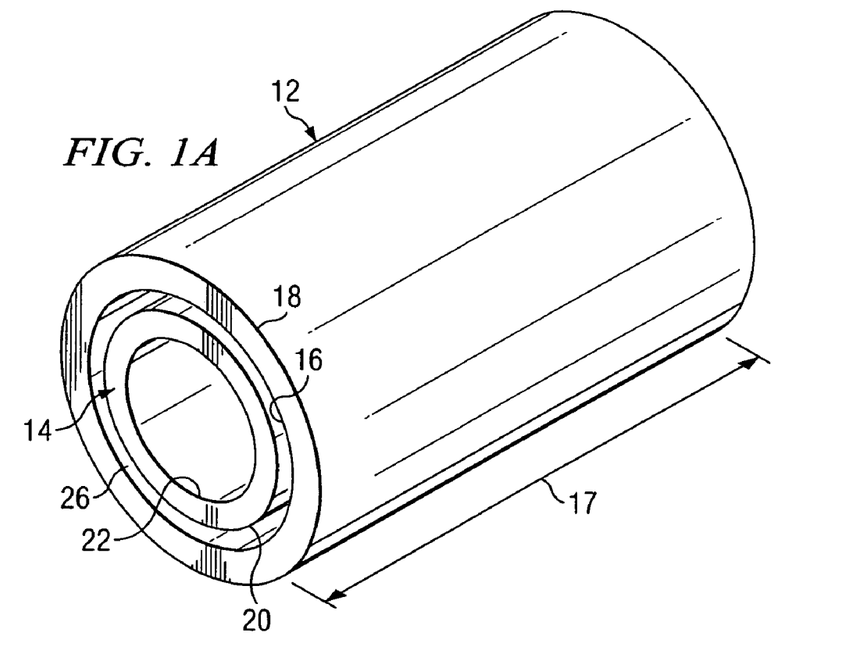
FIG. 1A is a schematic drawing showing an isometric view with portions broken away of an inner shell and outer shell used to form a bimetallic pipe in accordance with teachings of the present invention.

The method may start with outer shell 12 and inner shell 14 as illustrated in FIG. 1A. Outer shell 12 may be a pipe or tube having desired outside diameter 18, inside diameter 16 and length 17. Outer shell 12 is preferably made of a durable material able to withstand internal fluid pressures. Outer shell 12 may also be strong enough to withstand external forces. In one embodiment, outer shell 12 includes a generally uniform wall thickness.

For some applications outer shell 12 may be formed by using electric resistant welding (ERW) technology. ERW technology often allows increased quality control of wall thickness and minimizes material defects. Uniform wall thickness characteristics inherent in ERW pipe often allow bimetallic pipe produced according to the teachings of the present invention to have better performance characteristics when compared with bimetallic pipe produced from seamless pipe. For example, bimetallic pipe formed with outer shell 12 of ERW pipe may have better dimensional control. However, seamless pipe may also be used to form bimetallic pipe in accordance with teachings of the present invention.

In one embodiment, outer shell 12 may include API line pipe. In other embodiments, outer shell 12 may be well casing or tubing. Outer shell 12 typically includes inner diameter 16 larger than outer diameter 20 associated with inner shell 14. For some applications outer shell 12 may have outer diameter 18 of approximately twenty inches or smaller.

Inner shell 14 may be a pipe made from corrosion resistant alloys of a specific type based on intended use of the resulting bimetallic pipe. Inner shell 14 may include an industry standard CRA pipe required for expected use of the resulting bimetallic pipe or tubing. Alternatively, outer shell 12 may be formed from corrosion resistant metals and alloys. Inner shell 14 may be formed from materials with other desired characteristics such as light weight or high strength.

CRA pipe may encompass a wide range of corrosion resistant metals and alloys including, but not limited to titanium, chromium, iron, nickel, copper, zinc, molybdenum and combinations thereof. Having inner shell 14 made out of corrosion resistant material allows caustic and potentially hazardous substances to be transported through resulting bimetallic pipe 10.

Figure 1B:
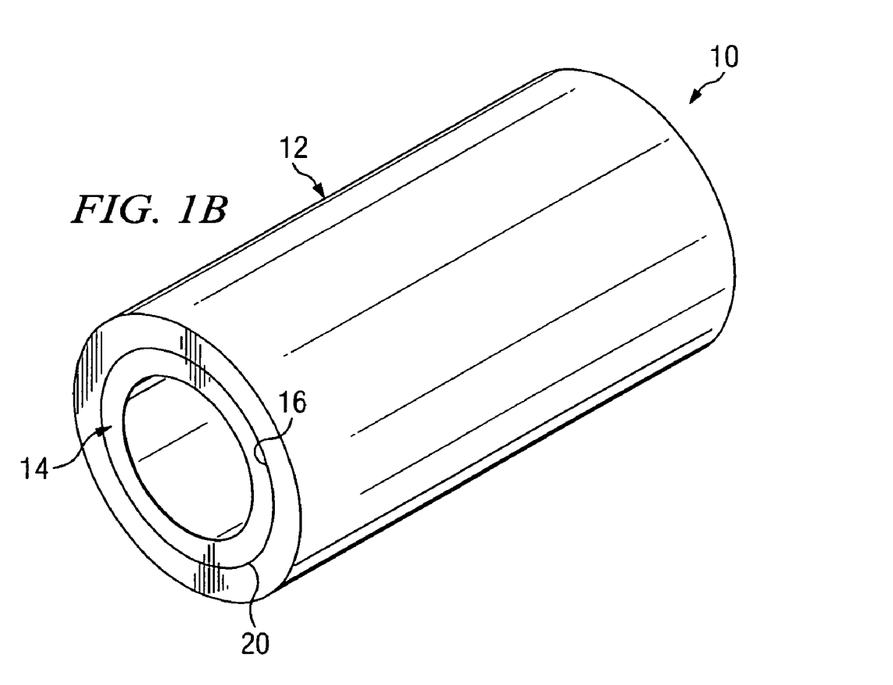
FIG. 1B is a schematic drawing showing an isometric view with portions broken away of a bimetallic pipe formed in accordance with teachings of the present invention.

Outside diameter 20 or exterior of inner shell 14 is preferably selected to be compatible with the inside diameter 16 or interior of outer shell 12. FIG. 1A shows inner shell 14 disposed within or telescoped within outer shell 12. Because outside diameter 20 of inner shell 14 is smaller than inside diameter 16 of outer shell 12, there exists an annulus or gap 26 between inner shell 14 and outer shell 12. Various techniques incorporating teachings of the present invention may be used to reduce outer shell 12. Diameters 16 and 18 of outer shell 12 are preferably reduced so that inner diameter 16 securely engages outer diameter 20 of inner shell 14 and annulus 26 is eliminated resulting in bimetallic pipe 10 as illustrated in FIG. 1B.

Figure 2:
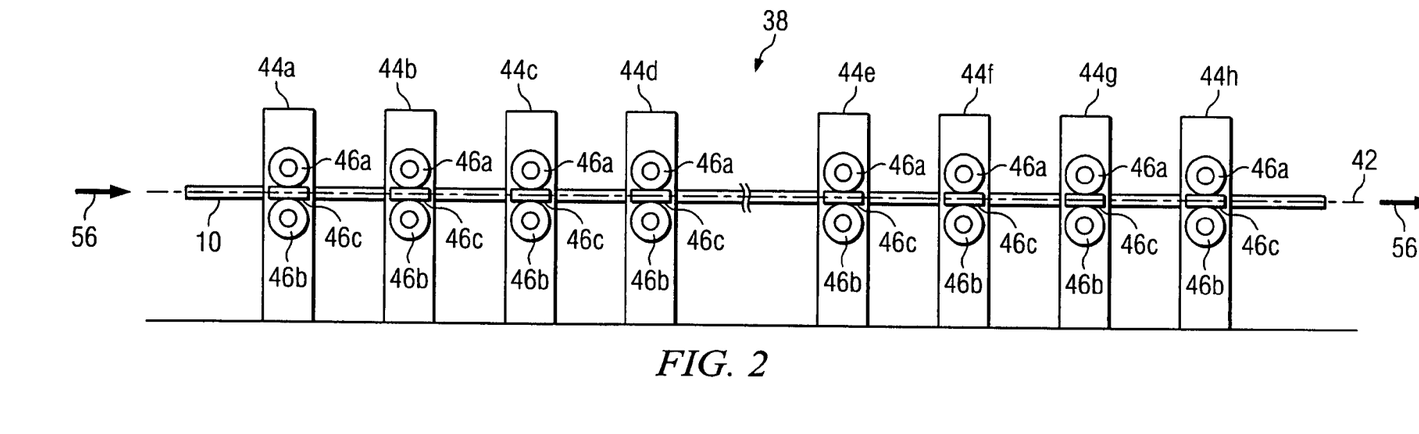
FIG. 2 is a schematic drawing with portions broken away showing one example of a system for producing bimetallic pipe in accordance with teachings of the present invention.

FIG. 2 illustrates a system, sizing mill 38, for producing bimetallic pipe 10. Sizing mill 38 includes size reducing line 42 for bimetallic pipe 10. Size reducing line 42 provides a pathway for reducing diameters 16 and 18 of outer shell 12 of bimetallic pipe 10. Bimetallic pipe 10 travels along size reducing line 42 in direction 56, here shown as moving from left to right.

Sizing mill 38 may also include at least four roller stands 44a-d arranged along size reducing line 42 for reducing diameters 16 and 18 of outer shell 12. Each roller stand 44a may include at least two rollers 46a and 46b. The illustrated embodiment has four rollers 46a-d per roller stand 44. Roller stands 44 may include screw and hydraulic systems to adjust rollers 46. Screw systems use the basic principle of a screw to adjust the space between associated rollers. Hydraulic systems use fluid pressure to adjust associated roller spacing.

Rollers 46 may comprise rollers used to form ERW pipe such as outer shell 12. Using the same rollers 46 as both sizing rollers and forming rollers may allow embodiments of the present invention to more efficiently use existing mill equipment to produce bimetallic pipe 10.

Figure 3A:
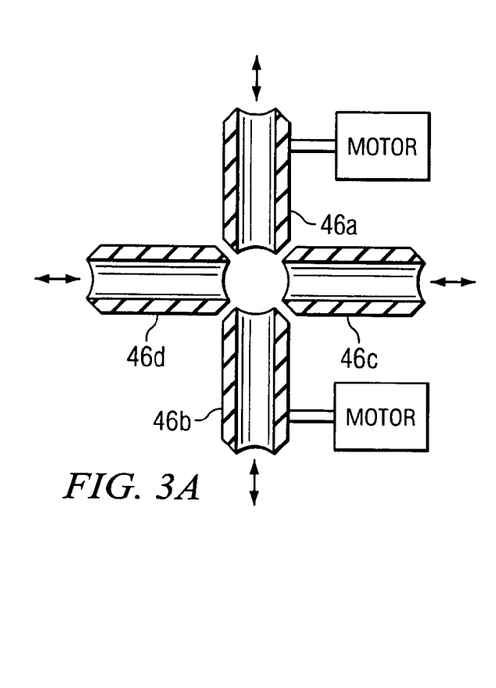
FIGS. 3A and 3B are schematic drawings showing alternative configurations for rollers according to the teachings the present invention.
Figure 3B:
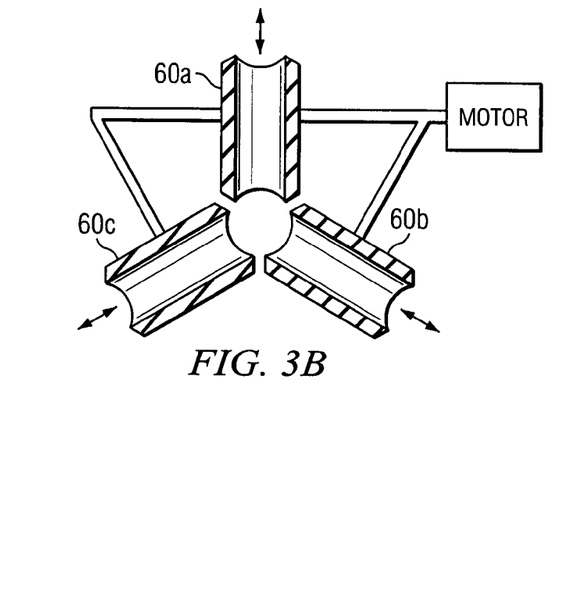

FIG. 3A illustrates a detail of the roller configuration in roller stand 44a with four rollers 46a-d. FIG. 3B illustrates an embodiment with three rollers (60a-c) per roller stand 44. Other embodiments may include more than four rollers per roller stand 44. In certain exemplary embodiments of the present invention, rollers 46a-d may be powered rollers. Powered rollers provide a driving mechanism to move bimetallic pipe 10 along size reducing line 42 in direction 56. In certain exemplary embodiments, only rollers 46a and 46b are powered rollers while rollers 46c and 46d are not powered.

In the illustrated embodiment, sizing mill 38 includes eight roller stands 44a-44h. In one embodiment, sizing mill 38 may include from four to sixteen roller stands 44. In another embodiment, system 38 may include six roller stands 44. In another embodiment, system 38 may include sixteen roller stands 44.

Figure 4A:
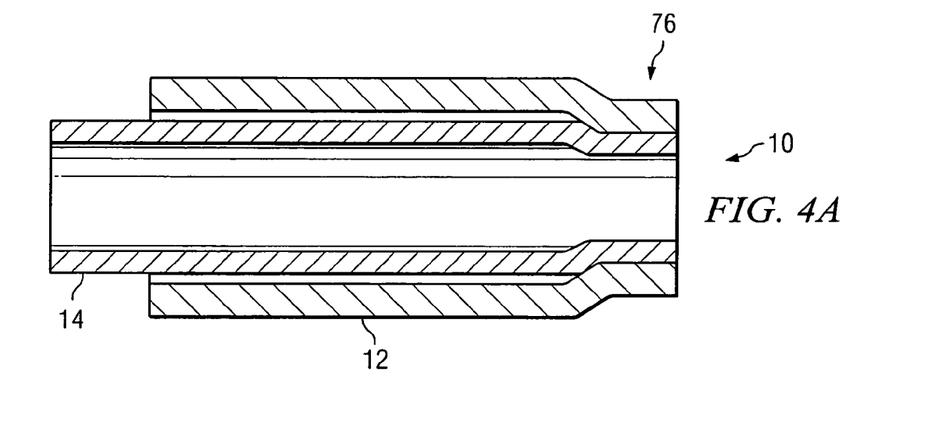
FIGS. 4A thru 4D are schematic drawings with portions broken away illustrating other example systems for producing bimetallic pipe in accordance with teachings of the present invention.

FIGS. 4A thru 4D illustrate various systems for producing bimetallic pipe 10 using die 72 without the use of a mandrel. FIG. 4A displays "pointing" or "swaging" portions of outer shell 12 and inner shell 14. In certain exemplary embodiments of the present invention, outer shell 12 and inner shell 14 are swaged together to form swaged end 77. Swaging generally entails pinching a portion of outer shell 12 to securely engage inner shell 14. However, one skilled in the art, with the benefit of disclosure, will recognize other suitable methods to engage swaged portions of outer shell 12.

Figure 4B:
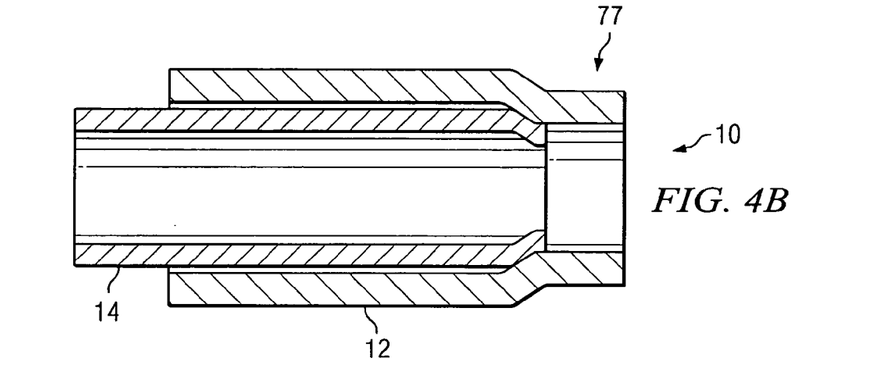
Figure 4C:
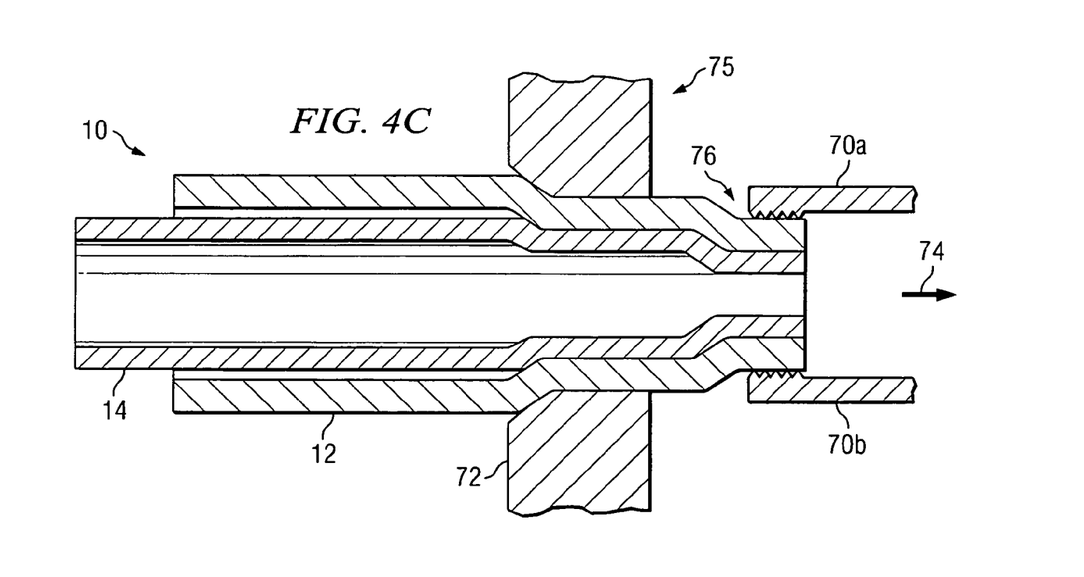

FIG. 4C illustrates system 75 to produce bimetallic pipe 10 by drawing outer shell 12 and inner shell 14 through die 72 without the use of a mandrel. A mandrel is generally a bar of metal inserted into a pipe, such as inner shell 14, to maintain inner diameter 22 of inner shell 14. A mandrel is not required during the drawing process in embodiments of the present invention.

In an embodiment of the present invention, after portions of outer shell 12 and inner shell 14 have been swaged with each other, grippers 70a and 70b may draw outer shell 12 and inner shell 14 through die 72. FIG. 4C illustrates securely engaging grippers 70a and 70b with swaged end 76 of outer shell 12. Grippers 70a and 70b may draw outer shell 12 and inner shell 14 through die 72 in direction 74 without the use of a mandrel. Die 72 may be a metal block with an opening capable of reducing diameters 16 and 18 of outer pipe 12 when drawn therethrough. Various types of commercially available dies may be satisfactorily used. Die 72 reduces outer shell 12 to securely engage inner shell 14 without any significant changes to diameter 20 and 22 of inner shell 14 to form bimetallic pipe 10. In certain exemplary embodiments of the present invention, outer shell 12 and inner shell 14 are cold drawn through die 72.

In some instances, swaged end 76 may be of sufficient length to be inserted though die 72 such that grippers 70a and 70b may fit around swaged end 76 as shown in FIG. 4C. In other embodiments, long grippers (not expressly shown) may extend through die 72 to fit around swaged end 76. In either instance, grippers 70a and 70b may then be used to pull bimetallic pipe 10 through die 72 along line 74.

The present example describes bimetallic pipe 10 as being pulled through die 72. However, in other examples, bimetallic pipe may be forced through die 72 such as in a push bench operation (not expressly shown). In addition to the use of pipe roller stands, both pulling and pushing bimetallic pipe 10 through die 72 may illustrate some examples of cold reduction of pipes.

As bimetallic pipe 10 moves through die 72, outer shell 12 is deformed towards inner shell 14. Generally, outer shell 12 engages and deforms inner shell 14. In some embodiments, the deformation of inner shell 14 is preferably elastic. Typically, the deformation or reduction of inner shell 14 is about half of its original wall thickness, which may be an approximate estimate of the elastic limit of inner shell 14. However, in some instances, the inner shell 14 may undergo some plastic deformation in addition to the elastic deformation.

In any event, the deformation of inner shell 14 still maintains some elastic deformation to create a residual elasticity. The residual elasticity allows inner shell 14 to "spring" back towards it original shape but will be limited by outer shell 12. The resultant force of inner shell 14 against outer shell 12 due to the residual elasticity creates a compression force between the shells. This force provides a strong mechanical bond or engagement between inner shell 14 and outer shell 12 of bimetallic pipe 10.

In the reduction or cold sizing process, outer shell 12 typically tends to elongate as compared to inner shell 14. Because of this elongation, outer shell 12 may initially seem shorter than inner shell 14. But following the sizing process, the ends of both inner shell 14 and outer shell 12 opposite swaged end 76 may be approximately equal. Thus, after removal of swaged end 76, inner shell 14 and outer shell 12 are equal over the length of bimetallic pipe 10.

Generally, swaged end 76 is crimped to a smaller diameter as compared to the rest of bimetallic pipe 10. In order to create a pipe of a consistent size, swaged end 76 is usually removed or "cropped" from bimetallic pipe 10 as a waste product.

To avoid wasting a large portion of the more expensive inner shell 14, the ends of inner shell 14 and outer shell 12 may be offset and swaged as shown in FIG. 4B. Offset swaged end 77 typically has inner shell 14 pulled inside of outer shell 12 such that the crimped or swaged portion is mainly over the portion of outer shell 12. Inner shell 14 may be placed sufficiently inside of offset swaged end 77 to allow for some of inner shell 14 to be deformed such that inner shell 14 and outer shell 12 are sufficiently connected at offset swaged end 77.

Figure 4D:
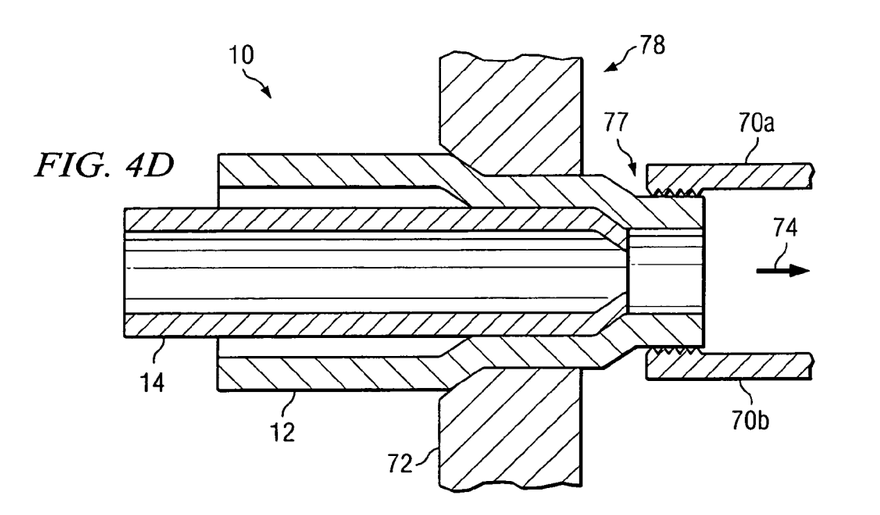

Once swaged, bimetallic pipe 10 may be cold sized such as in die process 78 shown in FIG. 4D. For example, offset swaged end 77 may be held by grippers 70a and 70b and pulled through die 72. Once through the die or another cold sizing process, offset swaged end 77 may be removed from bimetallic pipe 10 such that most of the removed material is outer shell 12. As compared with swaged end 76, the removal of offset swaged end 77 results in only a small portion of inner shell 14 being removed as scrap or waste. In some instances, the use of offset swaged end 77 may save as much as five percent of inner shell 12 from being wasted from each bimetallic pipe 10 formed.

Figure 5:
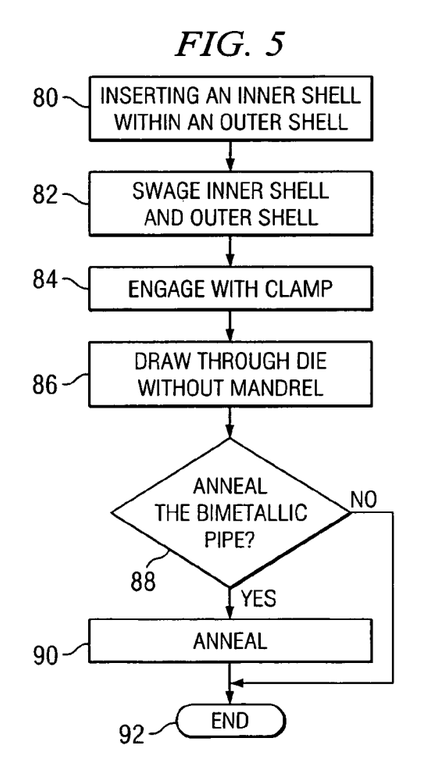
FIG. 5 illustrates a flow diagram of a method for producing a bimetallic pipe using a die without a mandrel.

FIG. 5 illustrates a flow diagram for an example method of the present invention for producing bimetallic pipe 10 using die 72 without the use of a mandrel. The method begins at step 80, where inner shell 14 is inserted into outer shell 12. Once inner shell 14 has been disposed within outer shell 12, the method proceeds to step 82, where inner shell 14 and outer shell 12 may be "pointed" or "swaged" together. Swaging may prevent inner shell 14 from extracting from outer shell 12.

After inner shell 14 and outer shell 12 are swaged, the method proceeds to step 84. At step 84, clamps 70a and 70b engage inner shell 14 and/or outer shell 12.

At step 86, outer shell 12 and inner shell 14 are drawn through die 72 without the use of a mandrel to reduce outer shell 12 to securely engage inner shell 14. In one embodiment, clamps 70a and 70b pull outer shell 12 and inner shell 14 in direction 74 through die 72. This step does not require a mandrel to maintain inner diameter 22 of inner shell 14.

In one embodiment of the present invention, reducing diameters 16 and 18 of outer shell 12 may involve cold drawing through die 72 without the use of a mandrel. Cold drawing outer shell 12 involves working the metal at a low temperature (often room temperature). At the end of step 86 bimetallic pipe 10 is produced.

At step 88, the bimetallic pipe producer may decide whether to anneal bimetallic pipe 10. If the producer of bimetallic pipe 10 decides not to anneal, the method proceeds to step 92 where bimetallic pipe 10 is ready for use.

If the bimetallic pipe producer decides to anneal, the method proceeds to step 90 where the bimetallic pipe 10 is annealed. Annealing bimetallic pipe 10 typically involves heating outer shell 12 and inner shell 14 to a designated temperature for a sufficient amount of time and then cooling the pipe. Annealing bimetallic pipe 10 requires consideration of different thermal expansion characteristics of outer shell 12 and inner shell 14. Annealing may be used to remove residual stresses in the drawn tube. In one embodiment of the present invention, annealing outer shell 12 and inner shell 14 does not chemically bond or metallurgically bond inner shell 14 and outer shell 12 with each other. After annealing is complete, the method proceeds to step 92 where bimetallic pipe 10 is ready for use.

Figure 6:
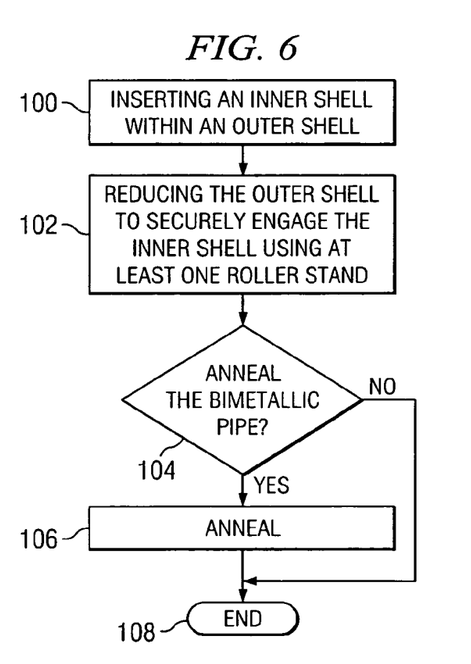
FIG. 6 illustrates a flow diagram of a method for producing a bimetallic pipe using at least one roller stand.

FIG. 6 illustrates an example method of the present invention for producing bimetallic pipe 10 using at least one roller stand 44. The method begins at step 100, where inner shell 14 is inserted into outer shell 12. At step 100, portions of outer shell 12 and inner shell 14 may be swaged together or otherwise connected with each other. Once inner shell 14 is disposed within outer shell 12, the method proceeds to step 102.

At step 102 at least one roller stand 44 reduces outer shell 12 to securely engage inner shell 14. By passing outer shell 12 through roller stand 44, annulus 26 between outer shell 12 and inner shell 14 is reduced. Sizing mill 38 may have multiple roller stands 44. In one embodiment of the present invention, sizing mill 38 may include at least four roller stands 44. In an exemplary embodiment, sizing mill 38 may include six roller stands 44. In another embodiment, sizing mill 38 may include four to sixteen roller stands 44. At the end of step 102 bimetallic pipe 10 is produced.

The method proceeds to step 104, where a bimetallic pipe producer must decide whether to anneal bimetallic pipe 10. If the producer decides not to anneal bimetallic pipe 10, the method proceeds to step 108, where bimetallic pipe 10 is ready for use.

If the producer decides to anneal bimetallic pipe 10, then the method proceeds to step 106 where the same process of annealing is done as described in FIG. 5, step 90. The method then proceeds to step 108 where bimetallic pipe 10 is ready for use.

The previous methods described may be used to produce line pipe, casing, tubing as well as other applications for bimetallic pipe. Line pipe is typically used in the surface transmission of oil, natural gas and other fluids. Casing or well casing, is typically used as a structural retainer for oil and gas wells. Casing is used to prevent contamination of both the surrounding water table and the well itself. Casing preferably lasts the life of a well and is not usually removed when a well is plugged and abandoned. Tubing may refer to Oil Country Tubular Goods (OCTG) applications and petrochemical applications. OCTG is a label typically applied to the pipe products used by petroleum exploration customers, such as tubing and casing. When referring to OCTG, tubing is a separate pipe used within the casing to conduct the oil or gas to the surface. Depending on conditions and well life, tubing may have to be replaced during the operational life of a well. When referring to petrochemical applications, tubing may refer to tubes used to transport chemical substances within a petrochemical plant. All the above applications list potential uses for bimetallic pipe 10 produced according to methods of the present invention. This list does not limit the other potential applications for bimetallic pipe 10 formed in accordance with teachings of the present invention.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for producing bimetallic pipe comprising:
   providing an outer shell and an inner shell with the outer shell having an inner diameter larger than an outer diameter associated with the inner shell;
   inserting the inner shell within the outer shell;
   swaging an end of the inner shell with an end of the outer shell wherein the swaging comprises pinching a portion of the outer shell to engage a portion of the inner shell to form a swaged end;
   inserting the swaged end through a die; and
   reducing the outer shell to securely engage the inner shell and eliminate the annulus between inner shell and outer shell, by drawing the outer shell and inner shell through the die without placing a mandrel within the inner shell.

2. The method of claim 1, further comprising annealing the outer shell and inner shell.

3. The method of claim 1, further comprising annealing the outer shell and inner shell without chemically bonding the outer shell and inner shell.

4. The method of claim 1, wherein reducing the outer shell to securely engage the inner shell by drawing comprises cold drawing the outer shell and inner shell through the die.

5. The method of claim 1, wherein the outer shell comprises line pipe.

6. The method of claim 1, wherein the outer shell comprises casing.

7. The method of claim 1, wherein the outer shell comprises tubing.

8. The method of claim 1, further comprising forming the outer shell from an electric resistance welded pipe.

9. The method of claim 1, further comprising forming the outer shell with a uniform wall thickness.

10. The method of claim 1, further comprising forming the outer shell with an outer diameter of twenty inches or less.

11. The method of claim 1, further comprising forming the inner shell from a corrosion resistant alloy.

12. The method of claim 1, wherein swaging further comprises substantially aligning the ends of the inner shell and the outer shell before swaging.

13. The method of claim 1, wherein swaging further comprises creating an offset swage end such that the end of the inner pipe offsets from the end of the outer pipe.

14. The method of claim 1, wherein the swaged end is crimped prior to reducing the outer shell to securely engage with the inner shell to form a crimped swaged end.

15. The method of claim 14, further comprising cropping the crimped swaged end.

16. A method for producing bimetallic pipe comprising:
    providing an outer shell and an inner shell with the outer shell having an inner diameter larger than an outer diameter associated with the inner shell;
    inserting the inner shell within the outer shell;
    swaging an end of the inner shell with an end of the outer shell comprising pinching a portion of the outer shell to engage a portion of the inner shell to form a swaged end;
    inserting the swaged end through a die;
    eliminating an annulus that is disposed between the inner shell and the outer shell by reducing the outer shell to securely engage the inner shell by drawing the outer shell and inner shell through the die without placing a mandrel within the inner shell; and
    wherein reducing the outer shell to securely engage the inner shell further comprises deforming the inner shell to half wall thickness of the inner shell.

17. A method for producing bimetallic pipe comprising:
    providing an outer shell and an inner shell with the outer shell having an inner diameter larger than an outer diameter associated with the inner shell;
    inserting the inner shell within the outer shell;
    connecting an end of the inner shell with an end of the outer shell by swaging which comprises pinching a portion of the outer shell to engage a portion of the inner shell to form a swaged end;
    reducing the outer shell to securely engage the inner shell by drawing the outer shell and inner shell through a die to eliminate a gap that exists between the inner shell and the outer shell without placing a mandrel within the inner shell; and
    wherein reducing the outer shell to securely engage the inner shell further comprises deforming the inner wall to approximately an elastic limit of the inner shell.

18. The method of claim 17, wherein reducing the outer shell to securely engage the inner shell further comprises creating a residual elasticity in the inner shell.

19. The method of claim 18, further comprising using the residual elasticity to compress the inner shell against the outer shell to form a strong mechanical bond.

20. A method for producing bimetallic pipe comprising:
providing an outer shell and an inner shell with the outer shell having an inner diameter larger than an outer diameter associated with the inner shell;
disposing the inner shell within the outer shell;
swaging an end of the inner shell with an end of the outer shell comprising pinching a portion of the outer shell to engage a portion of the inner shell to form a swaged end;
inserting the swaged end through a die thereby obtaining a crimped swaged end having a smaller diameter than the diameter of the swaged end prior to the inserting through the die;
reducing the outer shell to securely engage the inner shell and eliminate an annulus between the inner shell and the outer shell, by drawing the outer shell and inner shell through the die without placing a mandrel within the inner shell; and
cropping the crimped swaged end thereby obtaining a bimetallic pipe with a consistent size.

21. A method of claim 20, further comprising engaging the swaged end with one or more grippers.

22. A method for producing bimetallic pipe comprising:
providing an outer shell and an inner shell with the outer shell having an inner diameter larger than an outer diameter associated with the inner shell;
disposing the inner shell within the outer shell;
swaging an end of the inner shell with an end of the outer shell comprising pinching a portion of the outer shell to engage a portion of the inner shell to form a swaged end;
inserting the swaged end through a die;
reducing the outer shell to securely engage the inner shell to eliminate an annulus between the inner shell and the outer shell by drawing the outer shell and inner shell through the die without placing a mandrel within the inner shell thereby obtaining a bimetallic pipe; and
annealing the bimetallic pipe by heating the outer shell and the inner shell to a designated temperature for a sufficient amount of time and then cooling the bimetallic pipe.

23. A method of claim 22 further comprising crimping and cropping the swaged end.

24. A method for producing bimetallic pipe comprising:
providing an outer shell and an inner shell with the outer shell having an inner diameter larger than an outer diameter associated with the inner shell;
aligning the inner shell within the outer shell such that the ends of the inner shell and the ends of the outer shell are offset with each other;
swaging an end of the offset outer shell with an end of the offset inner shell by pinching a portion of the outer shell to engage a small portion of the inner shell to form an offset swaged end;
inserting the offset swaged end through a die;
reducing the outer shell to securely engage the inner shell to eliminate an annulus between the inner shell and the outer shell by drawing the outer shell and inner shell through the die without placing a mandrel within the inner shell thereby obtaining a bimetallic pipe; and
cropping the offset swaged end.

25. A method of claim 24, further comprising using grippers to draw the offset swaged end through the die.

26. A method of claim 24, further comprising crimping the offset swaged end.

27. A method of claim 24, further comprising annealing the bimetallic pipe by heating the outer shell and the inner shell to a designated temperature for a sufficient amount of time and then cooling the bimetallic pipe.

* * * * *